United States Patent
Bloching et al.

(10) Patent No.: US 10,969,012 B2
(45) Date of Patent: Apr. 6, 2021

(54) METHOD FOR ACTIVATING A PARKING LOCK OF A MOTOR VEHICLE

(71) Applicant: ZF Friedrichshafen AG, Friedrichshafen (DE)

(72) Inventors: Axel Bloching, Ravensburg (DE); Horst Leichsenring, Hohentengen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 52 days.

(21) Appl. No.: 16/462,979

(22) PCT Filed: Nov. 27, 2017

(86) PCT No.: PCT/EP2017/080456
§ 371 (c)(1),
(2) Date: May 22, 2019

(87) PCT Pub. No.: WO2018/114227
PCT Pub. Date: Jun. 28, 2018

(65) Prior Publication Data
US 2019/0323604 A1    Oct. 24, 2019

(30) Foreign Application Priority Data
Dec. 19, 2016    (DE) ...................... 10 2016 225 401.4

(51) Int. Cl.
*F16H 63/34*    (2006.01)
(52) U.S. Cl.
CPC ................................ *F16H 63/3483* (2013.01)

(58) Field of Classification Search
CPC .... F16H 59/52; F16H 59/54; F16H 2059/525; F16H 2059/663; F16H 61/0021;
(Continued)

(56) References Cited

U.S. PATENT DOCUMENTS 6,260,934 B1 *   7/2001   Lee .......................... B60T 7/122
                                                         303/192
6,287,236 B1    9/2001   Ishikawa
(Continued)

FOREIGN PATENT DOCUMENTS

DE          100 52 260 A1    6/2002
DE    10 2006 022 963 A1    11/2007
(Continued)

OTHER PUBLICATIONS

German Search Report Corresponding to 10 2016 225 401.4 dated Jul. 19, 2017.
(Continued)

*Primary Examiner* — Edwin A Young
(74) *Attorney, Agent, or Firm* — Davis & Bujold PLLC; Michael J. Bujold

(57) ABSTRACT

A method for actuating a parking lock of a motor vehicle including a piston (10) which is arranged to move axially within a cylinder (9) of a parking lock actuator (8) and is acted upon by pressure in order to disengage the parking lock. A nominal pressure target, for disengaging the parking lock, is continuously increased from a first pressure value ($p_{start}$) until the parking lock is either disengaged or until a maximum pressure value ($p_{max}$) is reached.

10 Claims, 2 Drawing Sheets

(58) Field of Classification Search
CPC .. F16H 63/34; F16H 63/3483; F16H 2312/02; F16H 2312/04
See application file for complete search history.

(56) References Cited

U.S. PATENT DOCUMENTS

| | | | |
|---|---|---|---|
| 6,698,555 B2 | 3/2004 | Schäfer et al. | |
| 7,861,839 B2 | 1/2011 | Schweiher et al. | |
| 2002/0092720 A1* | 7/2002 | Schafer | B60T 1/005 |
| | | | 188/158 |
| 2003/0022754 A1 | 1/2003 | Koga | |
| 2007/0271017 A1* | 11/2007 | Samie | F16H 61/0213 |
| | | | 701/55 |
| 2009/0099746 A1* | 4/2009 | Hilberer | B60T 7/107 |
| | | | 701/70 |

FOREIGN PATENT DOCUMENTS

| | | |
|---|---|---|
| EP | 1 199 232 A2 | 9/2001 |
| JP | 2001-295922 A | 10/2001 |

OTHER PUBLICATIONS

International Search Report Corresponding to PCT/EP2017/080456 dated Feb. 8, 2018.
Written Opinion Corresponding to PCT/EP2017/080456 dated Feb. 8, 2018.

* cited by examiner

METHOD FOR ACTIVATING A PARKING LOCK OF A MOTOR VEHICLE

This application is a National Stage completion of PCT/EP2017/080456 filed Nov. 27, 2017, which claims priority from German patent application serial no. 10 2016 225 401.4 filed Dec. 19, 2016.

FIELD OF THE INVENTION

The present invention relates to a method for actuating a parking lock of a motor vehicle, wherein a piston arranged so that it can move axially in a cylinder of a parking lock actuator is acted upon by pressure in order to disengage the parking lock. In addition the invention relates to a control unit designed to carry out the method, and to a corresponding computer program product.

BACKGROUND OF THE INVENTION

Parking locks for passenger car automatic transmissions, which have long been known in practice, prevent the vehicle from rolling away unintentionally even when the motor is switched off. When a parking lock is activated or engaged, a transmission output shaft connected to drive wheels of the vehicle in a rotationally fixed manner is blocked so that on flat ground and on inclines the vehicle is secured against autonomously rolling away. Such parking locks are usually activated by a driver, by moving a selector lever to a parking position.

A design of a parking lock known from practice is configured with a parking lock wheel connected rotationally fixed to a transmission output shaft, which wheel on its outside has a type of spline shaft profile. In addition a locking pawl is provided, which when the parking lock is activated engages radially in the spline profile of the parking lock wheel, by which means the transmission output shaft is blocked.

When the parking lock is disengaged the pawl is withdrawn out of engagement with the parking lock wheel by a mechanically, hydraulically or electrically operated mechanism, so that the parking lock wheel or the transmission output shaft is released and the drive-train on its drive output side is no longer blocked. The disengagement of the parking lock also takes place in response to a corresponding indication of the driver's wish, and for this the driver moves the selector lever away from the parking position to any other position of the selector lever.

If the parking lock is actuated by an actuator in the form of a piston-cylinder unit actuated by pressure, then in the parking locks known from the prior art for passenger car automatic transmissions it is provided that the actuator is acted upon by a fixed, predetermined constant pressure in order to disengage the parking lock. This pressure is chosen such that the parking lock can also be disengaged when the vehicle is on an incline.

For example, a parking lock that can be actuated by means of a fluid actuator is known from DE 10 2006 022 963 A1.

SUMMARY OF THE INVENTION

Against that background the purpose of the present invention is to propose an improved method for actuating a parking lock of a motor vehicle, which besides reducing the load on actuating elements of the parking lock also enables reduced noise emission when the parking lock is actuated. In addition a corresponding control unit and a computer program product for carrying out the method should be indicated.

From the process-technological standpoint, this objective is achieved starting from the characterizing portions of the independent claim(s). A control unit and a computer program product are also objects of the independent claims. Advantageous further developments are the object of the subordinate claims and of the description given below.

According to the invention, a method is proposed for actuating a parking lock of a motor vehicle, in particular a utility vehicle, in which method a piston arranged to move axially in a cylinder of a parking lock actuator is acted upon by pressure in order to disengage the parking lock.

The parking lock comprises a parking lock wheel and a parking lock pawl arranged and able to pivot in a housing of a transmission, such that when the parking lock is engaged the pawl engages with interlock in the parking lock wheel. The parking lock is disengaged by means of the parking lock actuator, which is in the form of a piston-cylinder unit, such that to disengage the parking lock the piston arranged to move in the cylinder fixed to the housing is acted upon by pressure.

In the locking position of the parking lock—i.e. when the locking pawl is latched in a gap between teeth of the parking lock wheel—a locking element of the parking lock is clamped between the locking pawl and a guide-plate of the parking lock, in order to prevent the locking pawl from being dislodged from a gap between teeth of the parking lock wheel, so that a torque applied from the drive wheels of the motor vehicle on the drive output side to the transmission is supported against the locking pawl.

The torque is produced, for example, when a vehicle is standing on an incline and the downward force then exerted on the vehicle passes on the drive output side into the drive-train. By blocking the transmission output shaft by means of the parking lock, the drive-train between the drive wheels and the parking lock is locked, this locking increasing in intensity as a function of the inclination of the road.

On level ground a torque to be resisted can occur, for example, during a holding process or when the vehicle is at rest during loading or unloading.

Due to the locking in the drive-train, there is a torsional moment in the parking lock wheel which, by way of the teeth, produces a force between the parking lock wheel and the locking pawl which presses the locking pawl against the locking element. The larger this torsional moment, the larger is the force acting on the locking element and, consequently, the larger is also the force, or the pressure in the parking lock actuator, required for disengaging the parking lock.

Since the torsional moment increases in line with the inclination of the road, it is clear that to disengage the parking lock on an incline a larger force is needed than to disengage the parking lock on level ground. In the case of utility vehicles this effect is correspondingly more pronounced depending on the loading of the vehicle.

In a first embodiment the invention now applies the technical principle that a nominal pressure target for disengaging the parking lock, starting from a first pressure value, is increased continuously until the parking lock is disengaged or until a maximum pressure value has been reached.

In this case the first pressure value for disengaging the parking lock corresponds to a pressure value required for the parking lock to be reliably disengaged when the vehicle is on level ground and is unloaded.

In other words, otherwise than is known in the prior art the parking lock actuator is acted upon not with a fixed, predetermined constant pressure which reliably enables the parking lock to be disengaged even on an incline, but rather, a pressure that starts from an initial value corresponding to a pressure needed for disengaging the parking lock on level ground. If the parking lock is not disengaged by the initial action of pressure on the parking lock actuator, for example because the motor vehicle is standing on an incline, then in accordance with the nominal pressure target the parking lock actuator is acted upon by a higher pressure until the parking lock is disengaged or until a maximum pressure value has been reached.

It is provided that starting from the first pressure value, the nominal pressure target for disengaging the parking lock is increased in a ramp-like or stepped manner. This ensures that the parking lock is disengaged even if the first pressure value of the nominal pressure target is at first too low and the parking lock is not disengaged by the specified pressure value.

Thus, by virtue of the proposed method for actuating the parking lock, disengagement of the parking lock is carried out with the pressure or with the force required for it. The parking lock actuator is acted upon only with as much pressure as is needed for disengaging the parking lock. In that way, besides reduced the loading of the actuation elements of the parking lock, the noise emission when the parking lock is disengaged is also reduced.

In a second embodiment the invention applies the technical principle that a nominal pressure target for disengaging the parking lock is varied depending on a currently existing operating situation of the motor vehicle.

Thus, for example, the nominal pressure target for disengaging the parking lock can be varied as a function of information about the inclination of the motor vehicle or of the road. If the motor vehicle is on level ground, then a nominal pressure target for disengaging the parking lock is adopted, which is lower than for a motor vehicle standing on an incline. The current road inclination where the motor vehicle is located can be determined, for example, by an inclination sensor.

The nominal pressure target for disengaging the parking lock can also be varied as a function of information about the loading condition of the motor vehicle, and thus as a function of the vehicle's mass. Methods for determining the vehicle mass have long been known in the prior art and do not therefore need to be described in greater detail here. If the vehicle mass is large, for example 18 t, the initial value for the nominal pressure target is chosen higher than if the mass of the vehicle is smaller, for example 4 t. In that way, even in a loaded motor vehicle the parking lock can be disengaged quickly.

In taking into account the vehicle mass it is also considered whether, while the vehicle is at rest with its parking lock engaged, a trailer has been coupled to it or detached from it. Thus, the nominal pressure target for disengaging the parking lock is chosen larger if while the vehicle is at rest a trailer signal has been received, whereas in contrast, if while the vehicle is at rest a previously present trailer signal is no longer detected, the nominal pressure target is reduced to a lower value. By virtue of the trailer signal, which for example can be transmitted via a CAN bus system, it can be detected whether the motor vehicle is being operated with or without a trailer.

It is provided that the nominal pressure target for disengaging the parking lock is increased in a ramp-like or stepped manner starting from a nominal pressure determined as a function of the currently existing operating situation. This ensures that the parking lock is disengaged even if the nominal pressure of the nominal pressure target for the existing operating situation is at first too low and the parking lock is not disengaged by the specified nominal pressure.

According to a further variant of the method according to the invention, it is provided that a number of characteristic lines for the nominal pressure target for disengaging the parking lock are provided, each of which has a different starting value for the nominal pressure specification, and the characteristic line most appropriate for a current existing operating situation of the motor vehicle is used for disengaging the parking lock.

By virtue of the method according to the invention a parking lock of a motor vehicle can be disengaged quickly and comfortably, since the parking lock actuator is acted upon by a nominal pressure target appropriate for the current operating situation of the motor vehicle, such that besides reduced loading of the actuation elements of the parking lock, the noise emission when disengaging the parking lock is also reduced.

The invention also relates to a control unit designed to carry out the method according to the invention. The control unit comprises means that serve to carry out the method according to the invention. These means include hardware means and software means. The hardware means are data interfaces for exchanging data with the assemblies of the drive-train involved in carrying out the method according to the invention. For that purpose the control unit is also connected to the requisite sensors and, where necessary, also to other control units, in order to receive the decision-relevant data or to pass on control commands. An inclination sensor for determining a current road inclination at the position where the motor vehicle is located, can for example be integrated in the control unit. For example, the control unit can be in the form of a transmission control unit. The hardware means of the control unit are, in addition, a processor for data processing and if appropriate a memory for storing data. The software means are program blocks for carrying out the method according to the invention.

The system according to the invention can also be incorporated as a computer program product which, when it is run on a processor of a control unit, instructs the processor by software means to carry out the associated steps of the method according to the invention. In that connection the object of the invention also includes a computer-readable medium on which a computer program product as described can be retrievably stored.

The invention is not limited to the indicated combination of characteristics in the independent claims or in the claims that depend on them. There are also possibilities for combining individual features with one another, provided that they emerge from the claims, the following description of embodiments, or directly from the drawings. References in the claims by the use of indexes are not intended to restrict the protective scope of the claims.

BRIEF DESCRIPTION OF THE DRAWINGS

Below, examples of the invention are explained in greater detail with reference to the attached figures, which show.

DETAILED DESCRIPTION OF THE PREFERRED EMBODIMENTS

Figure 1:
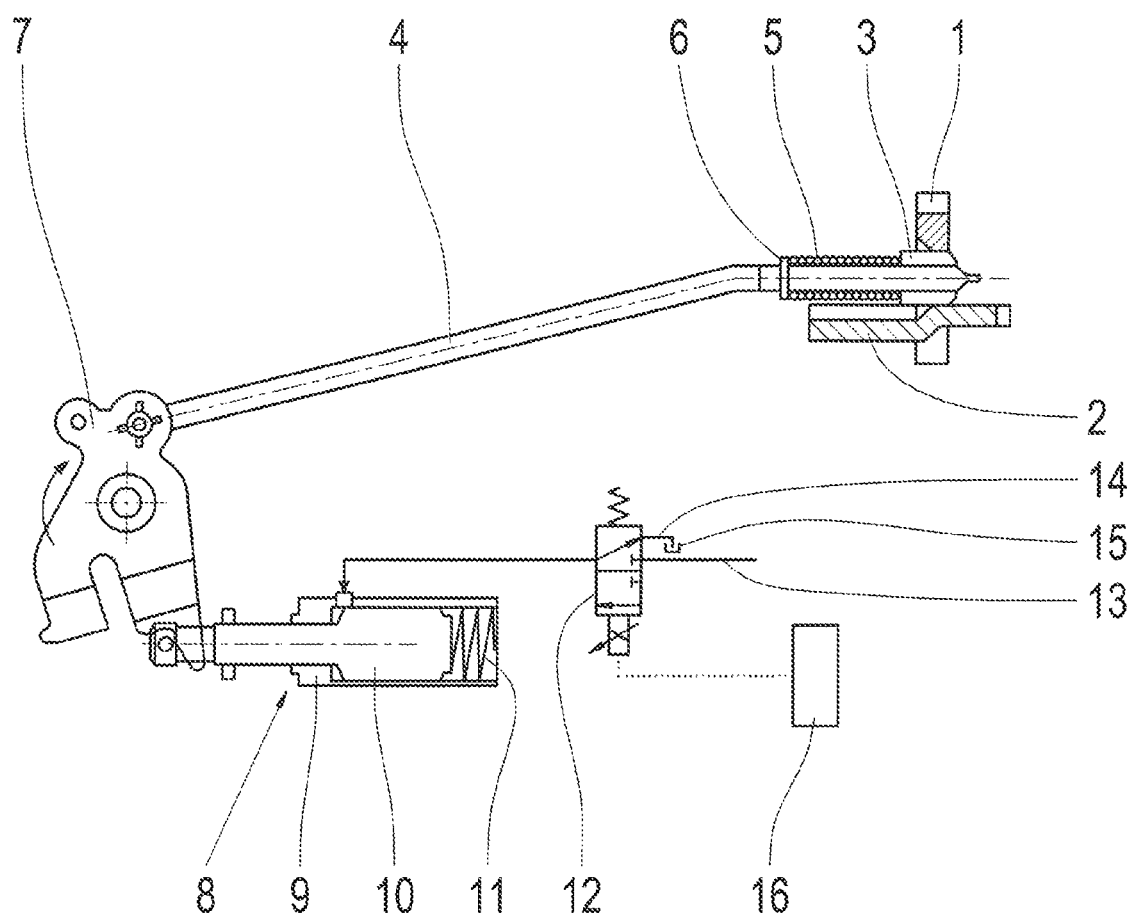
FIG. 1: A schematic representation of a parking lock of a motor vehicle.

The parking lock for a motor vehicle shown in FIG. 1 comprises a locking pawl 1, which engages in or out of a parking lock wheel (not shown) connected to a drive output (not shown) of a transmission, and a locking element 3 arranged axially movably on a connecting rod 4 to an actuating disk 7 made, for example, in the form of a parking disk, the element being made for example as a locking cone in this case. However, the locking element 3 could also be realized by means of appropriate roller elements. In the locked condition of the parking lock—i.e. when the locking pawl is engaged with interlock in a tooth gap of the parking lock wheel the locking element 3 is clamped between the locking pawl 1 and a guide plate 2 connected to a housing of the transmission (not shown) in order to prevent the locking pawl 1 from being dislodged from a tooth gap of the parking lock wheel. In this case the locking cone 3 is spring-loaded on the connecting rod 4 by a spring element 5, here for example in the form of a spiral spring, and prestressed in the axial direction. For this a stop 6 is arranged on the connecting rod 4, against which the spiral spring 5 is supported axially so that it prestresses the locking cone 3 in the axial direction against the locking pawl 1 and the guide plate 2. When the parking lock is engaged the locking pawl 1 is pushed by the locking element 3 against the parking lock wheel. When the locking pawl 1 encounters a tooth gap, it snaps in and locks the drive output. On the other hand, if the locking pawl 1 encounters a tooth of the parking lock wheel, then it is prestressed by the spring element 5 so that when the drive output rotates, with the help of the prestressing force the locking pawl 1 snaps into the next tooth gap of the parking lock wheel.

The parking disk 7 is connected to a parking lock actuator 8, which as shown in FIG. 1 is in the form of a piston-cylinder unit. To disengage the parking lock the parking lock actuator 8 is acted upon by pressure. In this case the piston-cylinder unit can be in the form of a hydraulic or pneumatic piston-cylinder unit and is accordingly acted upon by a hydraulic or pneumatic pressure medium.

For that purpose, pressure is delivered via a pressure medium delivery line 13 by way of a magnetic valve 12 into a cylinder of the parking lock actuator 8, whereby a piston 10 of the parking lock actuator 8 is moved axially in the cylinder 9 so that the locking element 3 connected via the parking disk 7 and the connecting rod 4 to the piston rod of the parking lock actuator 8, which element is between the locking pawl 1 and the guide plate 2, is pulled out.

To engage the parking lock, by means of the magnetic valve 12 the pressure to the cylinder 9 is cut off and the cylinder is vented via a drainage line 14 into a pressure medium sink 15. The parking lock actuator 8 or the piston 10 thereof is prestressed by means of a spring element in a locking position, so that if the pressure drops the parking lock moves to the engaged position and a transmission drive output shaft is blocked thereby. The spring element for prestressing the parking lock can for example be in the form of a compression spring 11 arranged in the cylinder 9 of the parking lock actuator 8 so that it exerts a corresponding force on the piston 10 of the parking lock actuator 8.

Alternatively or in addition to the spring element 11 shown in FIG. 1, the parking lock can be prestressed by a prestressed torsion spring (not shown) on the parking disk 7, by means of which the piston 10 of the parking lock actuator 8 is moved in the "parking" direction and the parking lock is engaged. Such torsion springs for prestressing a parking lock have long been known.

The magnetic valve 12 is connected to a control unit 16 and is controlled as a function of a selector lever position P, R, N, D. If the selector lever is in the positions R, N or D the magnetic valve is energized and the parking lock actuator 8 is acted upon by pressure, which results in disengagement of the parking lock. On the other hand, in the P position of the selector lever the magnetic valve 12 is not energized and the parking lock is engaged by means of the locking element 3.

In the engaged condition of the parking lock—i.e. when the locking pawl is latched into a tooth gap of the parking lock wheel—the locking element 3 of the parking lock is clamped between the locking pawl 1 and a guide plate 2 of the parking lock, so that a torque applied by the drive wheels on the drive output side to the transmission is supported on the locking pawl 1 and the drive-train is thereby locked.

A torsional moment exerted thereby on the parking lock wheel produces by means of the teeth between the parking lock wheel and the locking pawl 1 a force that presses the locking pawl 1 against the locking element 3. The larger the torsional moment, the larger is the force acting upon the locking element 3 and consequently the larger is the force or the pressure in the parking lock actuator 8 required for disengaging the parking lock.

Figure 2:
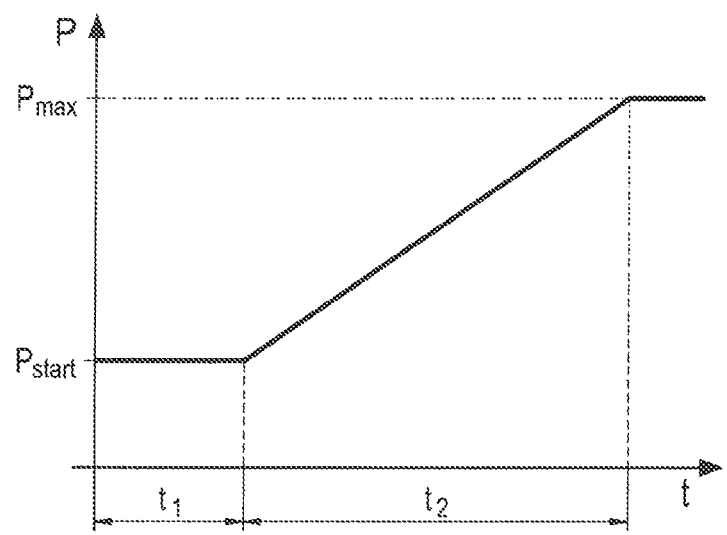
FIG. 2: A first pressure variation for controlling the parking lock.

FIG. 2 shows a first variation of a nominal pressure target for controlling the parking lock when the lock is to be disengaged. If the selector lever is moved away from the selector lever position P to another selector lever position R, N or O, then the magnetic valve 12 is energized by the control unit 16 and pressure is delivered to the parking lock actuator 8 in accordance with a nominal pressure target.

First, the piston 10 of the parking lock actuator 8 is acted upon for a specifiable time $t_1$ by a first pressure value $p_{start}$ which is needed in order to reliably disengage the parking lock when the motor vehicle is on level ground and is not loaded. This pressure value is substantially lower than a maximum pressure value $p_{max}$ and can for example lie within a range between 3 bar and 5 bar. The time $t_1$ can for example be calculated to allow the pressure according to the nominal pressure target to build up in the cylinder 9 of the parking lock actuator 8. If the pressure bunt up in the cylinder 9 of the parking lock actuator 8 and acting upon the piston 10 is not sufficient to pull out the locking element 3 between the locking pawl 1 and the guide plate 2, then in accordance with the nominal pressure target the pressure in the cylinder 9 is increased in a ramp-like manner during a second time $t_2$. The pressure ramp can for example be adjusted by means of a gradient target or a target-value specification.

The nominal pressure target is now increased along the pressure ramp until the parking lock has been disengaged or until a maximum pressure value $p_{max}$ has been reached. The disengagement of the parking lock can be detected by means of a parking lock sensor. The maximum pressure value $p_{max}$ is preferably calculated in such manner that it suffices to disengage the parking lock when the motor vehicle is fully loaded and is standing on an incline steeper than 15%. For example, the maximum pressure value $p_{max}$ can be in a range between 15 bar and 18 bar.

Figure 3:
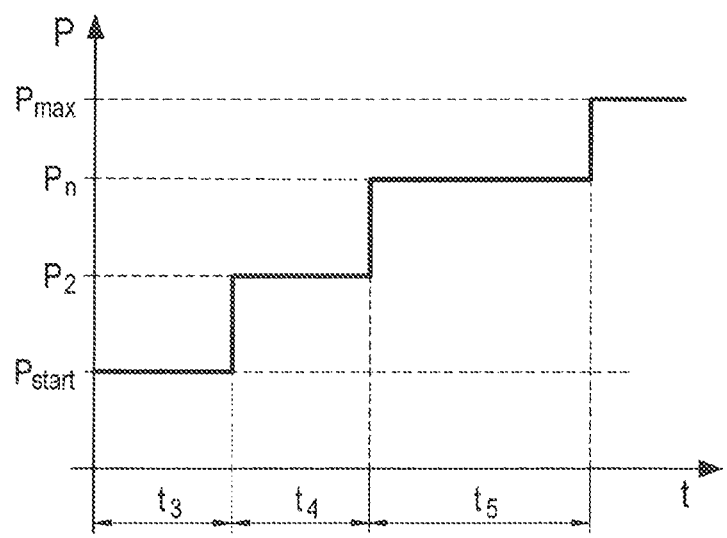
FIG. 3: A second pressure variation for controlling the parking lock.

FIG. 3 shows a second variation of a nominal pressure target for disengaging the parking lock. If the selector lever is moved away from the selector lever position P to another selector lever position R, N or D, then in this case too the magnetic valve 12 is energized by the control unit 16 and a pressure is delivered to the parking lock actuator 8 in accordance with a nominal pressure target.

In this case, however, the nominal pressure target does not show a ramp-like variation, but rather, the nominal pressure increases stepwise. At first the piston 10 of the parking lock actuator 8 is acted upon by a first pressure value $p_{start}$, for a first specifiable time $t_3$, which pressure is needed for disengaging the parking lock reliably when the motor vehicle is on level ground and is not loaded. This pressure value is substantially lower than a maximum pressure value $p_{max}$ and can for example be in a range between 3 bar and 5 bar. The time $t_3$ can for example be calculated to allow the pressure according to the nominal pressure target to build up in the cylinder 9 of the parking lock actuator 8. If the pressure built up in the cylinder 9 of the parking lock actuator 8 and acting upon the piston 10 is not sufficient to pull out the locking element 3 between the locking pawl 1 and the guide plate 2, then in accordance with the nominal pressure target the pressure in the cylinder 9 is increased in steps until the parking lock is disengaged or until a maximum pressure value $p_{max}$ has been reached. The pressure values $p_2$, $p_n$ between the first pressure value $p_{start}$ and the maximum pressure value $p_{max}$ are in turn maintained for specifiable times $t_4$, $t_5$ in order to enable the parking lock to be disengaged at these pressures. The maximum pressure value $p_{max}$ is preferably calculated such that it suffices to disengage the parking lock when the motor vehicle is fully loaded and standing on an incline steeper than 15%. In this case too the maximum pressure value $p_{max}$ can for example be in a range between 15 bar and 18 bar.

By virtue of the ramp-like or stepped nominal pressure target the parking lock actuator 8 can be acted upon with a pressure sufficient for disengaging the parking lock, regardless of the incline where the motor vehicle is located and regardless of the loading of the motor vehicle.

INDEXES

1 Locking pawl
2 Guide plate
3 Locking element
4 Connecting rod
5 Spring element
6 Stop
7 Parking disk
8 Parking lock actuator
9 Cylinder
10 Piston
11 Spring element
12 Switching valve
13 Pressure medium supply line
14 Drainage line
15 Pressure medium sink
16 Control unit

The invention claimed is:

1. A method for actuating a parking lock of a motor vehicle, the method comprising:
   pressurizing a piston arranged to move axially within a cylinder of a parking lock actuator to disengage the parking lock;
   providing a control unit with a plurality of characteristic lines of a nominal pressure target, and each of the plurality of characteristic lines having a different starting pressure value;
   selecting a characteristic line of the nominal pressure target from the plurality of characteristic lines of the nominal pressure target;
   acting on the piston with the starting pressure value of the selected characteristic line; and
   continuously increasing the nominal pressure target according to the selected characteristic line, for disengaging the parking lock, from the starting pressure value of the selected characteristic line either until the parking lock is disengaged or until a maximum pressure value is reached.

2. The method according to claim 1, further comprising increasing the nominal pressure target, starting from the starting pressure value, for disengaging the parking lock either in a ramp-like manner or in steps.

3. A control unit of a motor vehicle, which is designed to carry out the method for actuating the parking lock of the motor vehicle according to claim 1.

4. A computer program product with program code means, stored on a computer-readable data carrier and able to run on the control unit according to claim 3, for carrying out the method for actuating the parking lock of the motor vehicle.

5. A method for actuating a parking lock of a motor vehicle, the method comprising:
   selecting an initial pressure value of a nominal pressure target from a range of initial pressure values for disengaging the parking lock as a function of a value of torsional moment acting on the parking lock in a currently existing operating situation of the motor vehicle, such that the greater the value of the torsional moment acting on the parking lock is, the greater the initial pressure value from the range of initial pressure values is;
   pressurizing a piston arranged to move axially within a cylinder of a parking lock actuator to the selected initial pressure value to disengage the parking lock; and
   increasing the nominal pressure target from the selected initial pressure value either until the parking lock is disengaged or until a maximum pressure value is reached.

6. The method according to claim 5, further comprising selecting the starting pressure value of the nominal pressure target, for disengaging the parking lock, depending on an inclination of either the motor vehicle or of a road on which the motor vehicle is located, such that the starting pressure value selected is greater the greater the inclination is.

7. The method according to claim 5, further comprising selecting the starting pressure value of the nominal pressure target, for disengaging the parking lock, depending on a loading condition of the motor vehicle, such that the starting pressure value selected is greater the greater the loading condition is.

8. The method according to claim 5, further comprising determining the starting pressure value of the nominal pressure target, for disengaging the parking lock, while the vehicle is at rest with the parking lock engaged, based on whether a trailer is either coupled to or detached from the motor vehicle, such that one starting pressure value is determined when the trailer is detached from the motor vehicle, and another relatively higher starting pressure value is determined when the trailer is coupled to the motor vehicle.

9. The method according to claim 5, further comprising providing a plurality of characteristic lines for the nominal pressure target for disengaging the parking lock, and each of the plurality of characteristic lines having a different starting pressure value within the range of the starting pressure values and choosing an appropriate characteristic line based on the currently existing operating situation of the motor vehicle.

10. The method according to claim 5, further comprising, increasing the nominal pressure target from the starting pressure value, for disengaging the parking lock, in either a ramp-like or a stepped manner.

* * * * *